United States Patent [19]

Frank

[11] 4,103,313
[45] Jul. 25, 1978

[54] CIRCUIT FOR THE AUTOMATIC SCANNING ADJUSTMENT OF A VIDEO TAPE IN A VIDEO RECORDER

[75] Inventor: Egon Frank, Theisenort, Fed. Rep. of Germany

[73] Assignee: Loewe-Opta GmbH, Kronach, Fed. Rep. of Germany

[21] Appl. No.: 738,870

[22] Filed: Nov. 4, 1976

[30] Foreign Application Priority Data

Nov. 5, 1975 [DE] Fed. Rep. of Germany ....... 2549579

[51] Int. Cl.$^2$ ............................................. G11B 21/10
[52] U.S. Cl. .................................................... 360/70
[58] Field of Search ......................... 360/70, 73, 77, 78

[56] References Cited

U.S. PATENT DOCUMENTS

| 3,585,291 | 6/1971 | Yamakawa | 360/70 |
| 3,845,500 | 10/1974 | Hart | 360/73 X |
| 3,905,043 | 9/1975 | Frank | 360/70 |
| 3,943,565 | 3/1976 | Frank et al. | 360/77 X |

Primary Examiner—John H. Wolff

[57] ABSTRACT

A terminable scanning movement of a video tape track with respect to the scanning path of a playback head in a helical scan video recorder is provided with a staircase-type tracking control voltage. During each scanning cycle, in which each increment of the scanning voltage provides a monotonic, unidirectional translation of the tape track with respect to the scanning path by suitably altering the velocity of advance of the tape, the occurrence of a successive minimum and maximum in the resulting variation of detected video amplitude results in the generation of a stop signal. Such signal, which ideally coincides with the maximum amplitude of the detected voltage and thereby the desired registration position between the video tape track and the scanning path, is employed to stop the progression of the staircase voltage and to thereafter store the then-attained value for the maintenance of the tape drive servo at the optimum position.

9 Claims, 10 Drawing Figures

FIG.1

CIRCUIT FOR THE AUTOMATIC SCANNING ADJUSTMENT OF A VIDEO TAPE IN A VIDEO RECORDER

BACKGROUND OF THE INVENTION

The invention relates to helical scan video recorders adapted for reproducing video signals modulated on a highfrequency carrier and fixed on at least one track of an elongated magnetic tape that is wrappable helically about a rotatably mounted drum.

In arrangements of this type, at least one magnetic pick-up head that is rotatable in a scanning path on the periphery of the drum detects video signals that are modulated on an associated track of the tape as the tape is longitudinally advanced. In order to faithfully reproduce the video signal in the playback head, it is important to assure that each video track be brought into alignment with the scanning path of the associated magnetic pick-up head. This is accomplished by initially providing an oscillatory scan of each head with respect to the track, thereby imparting a corresponding cyclic variation in the video output from the track. Such video output variation may then be employed as a tracking control signal for application to a tape velocity regulating system, which in turn varies the velocity of the tape advance in a direction to correct any detected misalignment of the track and the head.

In one particularly advantageous arrangement of this type, the scanning operation is initiated by applying, to the tape drive servo, a sub-audio train of repetitive pulses to effect a generally triangular or sinusoidal wave modulation of the component of tape velocity parallel to the drum axis. Such cyclic modulation is superimposed upon a DC position error signal derived from the detected video envelope. At the conclusion of the predetermined interval normally required for the tape drive servo to adjust the tape track to its optimum position, the cyclically modulated error voltage is disconnected from the servo input, and a quiescent signal ideally of the appropriate magnitude necessary to maintain the tape in its optimum position is thereafter applied to the servo input.

One disadvantage of the last-mentioned arrangement is that the forced cyclic oscillation applied to the tape servo during the scan operation requires that at least several periods of such oscillation of the composite error signal picked up by the head must elapse before such composite signal is reduced to a value that is near optimum for servo track adjustment. The consequent predetermined interval between the start and termination of the scanning mode must accordingly be set at a relatively large value, so that the response of the overall track alignment operation is relatively slow. In addition, the circuitry and mechanisms necessary for the generation and application of the above-mentioned triangular or sinusoidal wave modulation of the tape advance velocity are complicated and expensive.

SUMMARY OF THE INVENTION

Such disadvantages are overcome with the tracking control signal generating arrangement of the invention, which is adapted to be employed with helical scan video recorders of the general type discussed above. Such facilities provide an extremely rapid convergence of the video tape track and the playback head scanning path after initiation of the scanning operation, and completely dispenses with the necessity of generating a separate cylic modulation for the tape servo and superimposing such cyclic modulation on the DC tracking control voltage derived from the detected video envelope.

In an illustrative embodiment, the tracking control signal is generated in the form of a DC staircase voltage which normally progresses incrementally from a relatively low value to a relatively high value in increments determined by the repetition interval of a clock pulse generator, with the staircase voltage dropping abruptly from the second value back to the first value at the end of a second interval. Such staircase voltage is normally applied to the tape velocity regulating system to initiate a tape scan in the form of a parallel linear displacement in a first direction; the corresponding detected video output will vary at the same rate along a curved characteristic that passes initially through a minimum and then through a maximum, with the maximum response generally indicative of the desired coincidence between the video tape track and the head scanning path.

A differentiating circuit coupled to an amplitude demodulator associated with the detecting magnetic head during such scanning operation provides an illustrative negativegoing pulse transition during the initiation of the scan, and thereafter provides, in succession, a positive-going pulse transition as the detected video amplitude goes through its minimum, followed by another negative-going pulse transition as the video amplitude moves through its desired maximum point.

A digital converter, in the form of an asynchronous divider, is coupled to the output of such differentiating circuit to provide a scan stop signal, such signal being effective to stop the progression of the staircase voltage and to store the last-attained value. Such stored value thereafter serves as a quiescent tracking control signal to maintain the tape servo at the value which ideally provided the maximum response of the detected video amplitude.

In order to compensate for the finite time delay between the occurrence of the maximum of the detected video amplitude and the occurrence of the second negative-going pulse transition in the differentiating circuit, a correcting element is disposed between the output of the staircase voltage generating means and the input of the tape velocity regulating system. Such correcting circuit, which is normally inactive, is rendered operative by the scan stop pulse to subtract, from the stored value of the staircase level, a predetermined voltage increment representing the amplitude jump of the staircase voltage during the interval between the detected maximum and the occurrence of the second negative-going pulse transition.

Since the return portion of the staircase voltage at the conclusion of each scanning cycle will require the servo to slew from its maximum displaced position to its initial position, facilities are provided for delaying the start of each succeeding scanning operation for an interval appropriate for the damping out of the servo transcients. Such facilities include an additional differentiator that provides a triggering pulse for a monostable multivibrator upon the occurrence of each return jump of the staircase voltage from its maximum to its minimum level; the triggering of the monostable multivibrator, in turn, will apply an inhibiting pulse to a control input of the staircase generator, thereby preventing a progression of the staircase voltage during the occurrence of such last-mentioned pulse.

Preferably, the last-mentioned inhibiting pulse from the monostable multivibrator is also employed to reset (1) the scan stop signal generator and (2) the differentiating stage that provides the oppositely-directed pulse transitions in response to the passage of the detected video amplitude through the respective minimum and maximum points.

BRIEF DESCRIPTION OF THE DRAWING

The invention is further set forth in the following detailed description taken in conjunction with the appended drawing, in which:

FIG. 1 is a combined block and schematic diagram of a portion of a helical scan video recorder having an arrangement for generating a tracking control signal in accordance with the invention;

DETAILED DESCRIPTION

Figure 1:
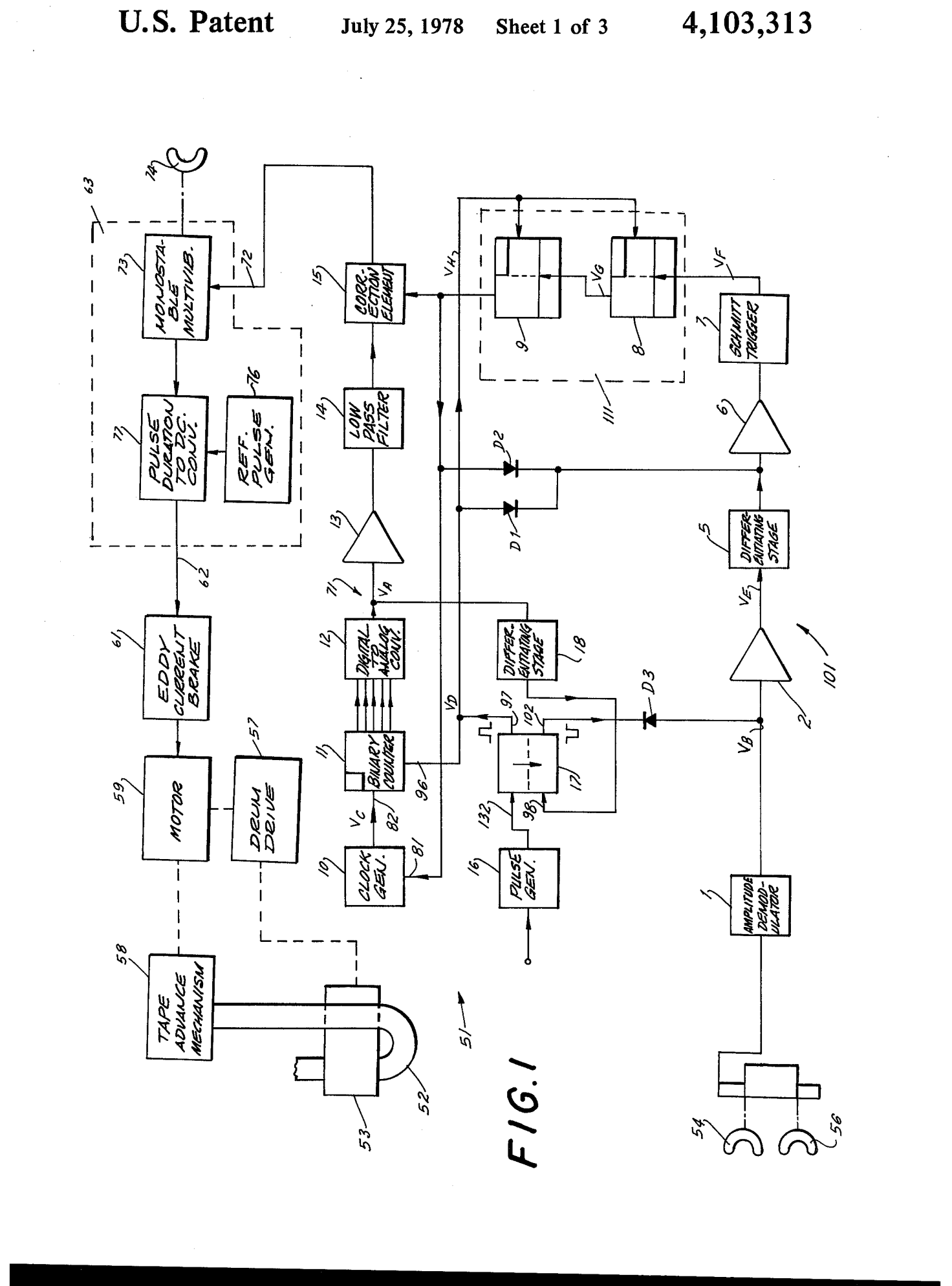
Figure 2:
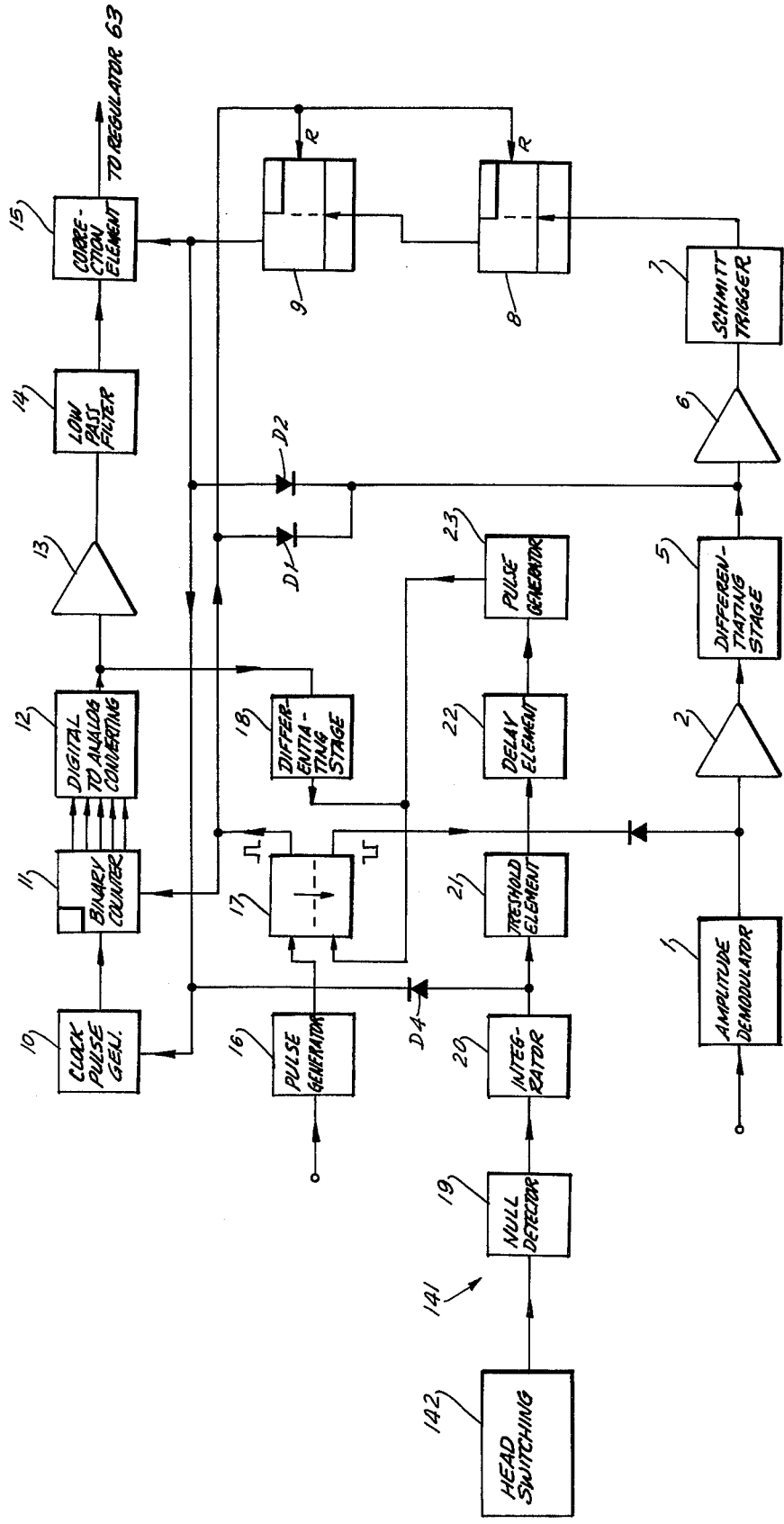
FIG. 2 is a combined block and schematic diagram, similar to FIG. 1, but incorporating additional circuitry responsive to a multi-track magnetic tape for inhibiting the track scanning signal provided with the arrangement of FIG. 1.

Referring now to the drawing, FIG. 1 depicts portions of a helical scan video recorder 51 having facilities for dynamically aligning a video track of an elongated magnetic tape 52, which is helically wrapped around a drum 53, with the scanning path of a pair of schematically indicated playback heads 54, 56. In practice, the heads 54, 56 may be disposed 180° around the periphery of the drum along a prescribed mean reference path. The drum 53 is rotatable about its axis by means of a suitable drive 57, while the tape is advanced longitudinally by a suitable take-up mechanism 58, which is driven by a motor 59 in timed relation to the drum rotation.

The tape 52 conventionally includes, among other carriers of information and synchronizing signals, a plurality of video tracks disposed in parallel relation at an oblique angle to the axis of the tape, each track bearing the video information in the form of a frequency modulated high-frequency carrier. The pitch of the helix defined by the wound tape 52 on the drum 53 is selected so that the video tracks on the tape are generally perpendicular to the drum axis and therefore parallel to the scanning path traced out by the playback heads 54, 56 as they rotate with the periphery of the drum. The track arrangement on the tape may, in particular, be similar to that indicated in FIG. 2 of U.S. Pat. No. 3,905,043, issued Sept. 9, 1975.

An eddy current brake 61 cooperates with the motor 59 to provide a variable drag on the tape advance. Such drag may be varied by a modulating voltage applied to an input 62 of the brake, and will correspondingly vary the advance velocity of the tape relative to the rotational speed of the associated playback heads.

The rate of advance of the tape 52 is subjected to a modulation by applying, to the brake 61, a suitable control voltage from a tape velocity regulator 63. Such modulation causes a corresponding displacement of each video track along a path parallel to the drum axis with respect to the position of the rotating head. This displacement, in turn, causes a corresponding variation of the amplitude envelope of the video signal detected by the playback heads 54, 56.

In order to correct misalignments between a recorded video track on the tape 52 and the scanning path of the associated playback head, the recorder 51 has associated therewith a track control signal generator 71, that is arranged to normally provide a repetitive control voltage $V_A$, which is suitably coupled to a control input 72 of the tape velocity regulator 63. In the particular arrangement of FIG. 1, the regulator 63 includes a monostable multivibrator 73, and the tracking control voltage applied to the input 72 serves to adjust the duration of the output pulse generated by the multivibrator 73 in response to a succession of sync pulses recorded on a suitable synchronizing track of the tape 52, and picked up by an auxiliary magnetic head 74 of the recording apparatus. With such arrangement, the train of pulses at the output of the multivibrator 73 have durations which vary in proportion to variations in the level of the tracking control voltage $V_A$. The output of the multivibrator 73 is compared with the output of a suitable reference generator 76 of standard-width pulses in a conventional pulse duration-to-voltage converter 77. The output of the converter 77 serves as the excitation signal for the brake 61 to correspondingly vary the velocity of the tape 52 in the manner described above.

Illustratively, the reference generator 76 may be a conventional frequency divider coupled to the 60 cycle output of the AC mains, and may include pulse shaping facilities so that a 30 cycle rectangular wave form of standard pulse width is applied to the converter 17.

In accordance with the invention, the tracking control signal generator 71 is so arranged that (1) in normal operation, the voltage $V_A$ takes the form of a staircase voltage that increases progressively over substantially the entire repetitive tracking interval, and then returns abruptly to its starting value, with the variation of the detected video envelope during the rising portion of the staircase characteristic ideally passing through successive minimum and maximum points, and (2) the linear advance of the staircase voltage is stopped, and the then-attained value stored, upon the occurrence of such successive minimum and maximum points during the rise of the staircase voltage.

The required tracking control voltage generator 71 includes a clock pulse generator 10, whose operation may be stopped by the application of a suitable pulse to a control input 81 thereof. The resultant output pulse sequence $V_C$ of the generator 10 is depicted in curve (C) of FIG. 3, and exhibits a repetition interval $T_A$.

The output of the clock generator 10 is applied to a count input 82 of a binary counter 11. During the application of the clock pulses, the counter 11 is stepped through all of its output states until the highest state condition is reached, whereupon the next clock pulse serves to restore the counter to its lowest or starting state.

The output of the counter 11 is decoded in a conventional digital-analog converter 12, whose output exhibits the DC staircase voltage $V_A$ indicated above. The voltage $V_A$ is illustrated in curve (A) of FIG. 3, and has a repetition interval $T_B$ determined by the count capacity of the counter 11 in a conventional manner. As indicated, the voltage $V_A$ exhibits a progressive incremental rise from a level 91 to a level 92, and then drops again to the level 91 at the conclusion of the then-current interval. The scan represented by the repetitive intervals $T_B$ will continue so long as the tape servo scans nonactive portions of the associated advancing tape.

Figure 3:
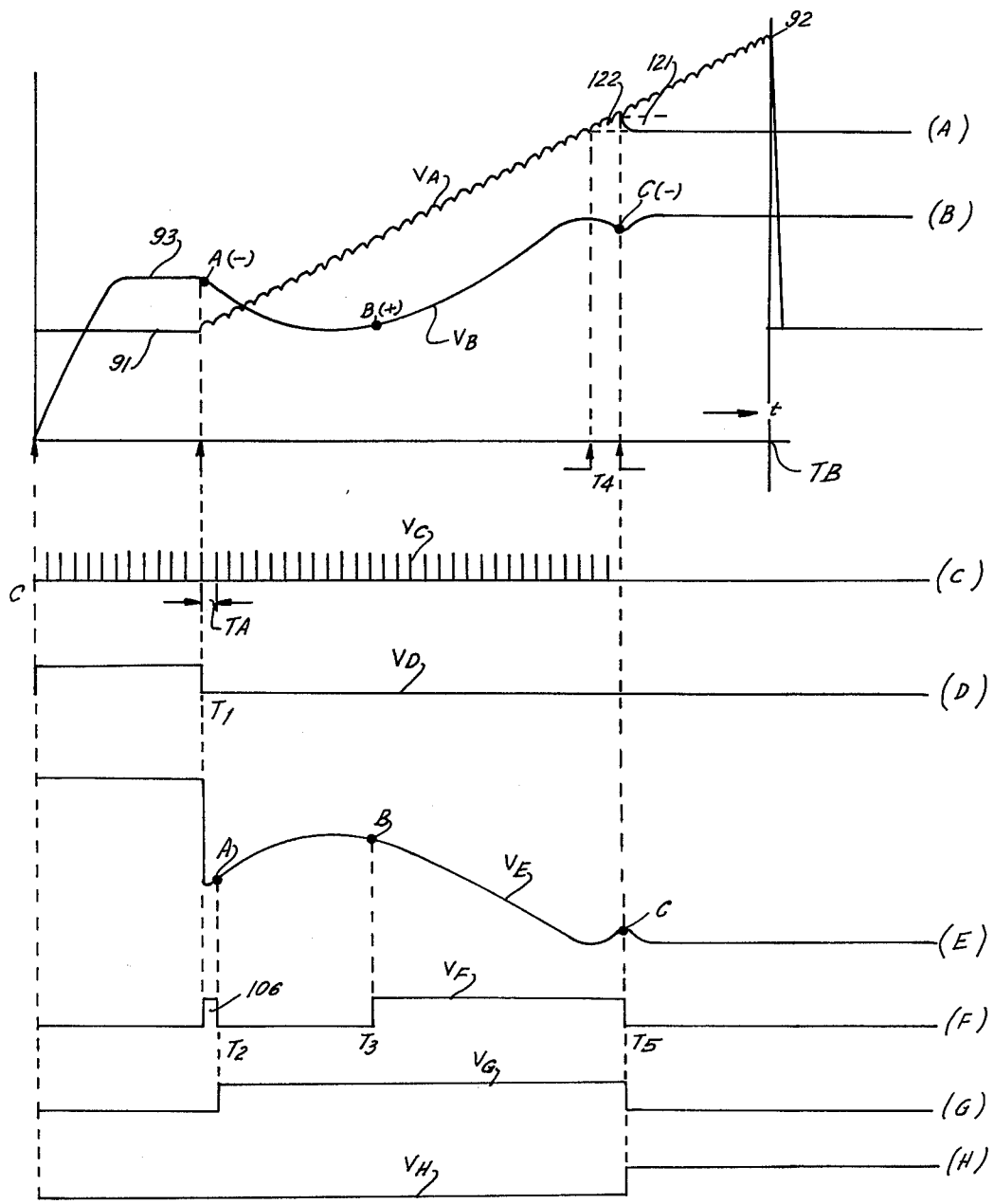
FIG. 3, including FIGS. A through H, is a set of timing diagrams illustrating the voltage relationships at various portions of the arrangement of FIG. 1.

As the active, or video signal-bearing, portions of the video tape advance in magnetic coupling relation to the magnetic pick-up heads 54, 56 (FIG. 1), the detected video amplitude voltage $V_B$, represented as curve (B) in FIG. 3, will exhibit the variation illustrated in such curve as a result of the incremental progression of the associated staircase voltage $V_A$ during the same repetition cycle $T_B$.

In the presence of the active portion of the tape, the wave form $V_B$, which in the arrangement of FIG. 1 is present at the output of an amplitude demodulator 1 coupled to the magnetic heads 54, 56, will rise to a particular level represented at 93, the amplitude of which is determined by the initial displacement of the video tape track from the scanning path of the heads 54, 56. The value 93 will initially remain constant since the staircase voltage $V_A$ is initially held constant at its minimum level 91 to inhibit a progressive incrementing of the tracking voltage for an interval (designated $T_1$ in FIG. 3) sufficiently long so that the tape drive servo has reached a steady state condition following a return slew operation, at the conclusion of the previous track scan, corresponding to the decrease in tracking voltage amplitude from the maximum value 92 to the minimum value 91.

In order to inhibit such initial scan-inhibiting interval, a reset input 96 of the binary counter 11 is coupled to a first output 97 of a monostable multivibrator 17, whose reset input 98 is coupled to the output of a differentiating stage 18. The input of the stage 18 is coupled to the output of the converter 12.

The stage 18 is arranged to respond to a negativegoing step of the voltage $V_A$ at the conclusion of each scan cycle to generate a trigger pulse, which when applied to the reset input 98 of the multivibrator 17 is effective to initiate on the output 97 an inhibit pulse having a duration equal to the desired scan-inhibiting interval $T_1$. The voltage at the output 97 of the multivibrator 17 is designated $V_D$, and is indicated in curve (D) of FIG. 3.

During the occurrence of the inhibiting pulse, the counter 11 is immobilized at its lowest level 91. At the conclusion of the pulse portion of the voltage $V_D$, the progressive advance of the staircase voltage $V_A$ is initiated, so that a corresponding relative linear movement between the video tape track and the scanning path of the heads 54, 56 takes place. Since such displacement affects the magnetic coupling between the heads 54, 56 and the video information on the moving track, the detected amplitude $V_D$ of the video voltage on the output of the demodulator 1 (FIG. 1) will vary along the path indicated at ABC in FIG. 3.

The initiation of the scanning operation will be accompanied by the enabling of a processing path 101 at the output of the demodulator 1. For this purpose, a complementary output 102 of the multivibrator 17 applies an enabling pulse to the input of a logarithmic amplifier 2 at the output of the demodulator 1. The resulting voltage $V_E$ at the output of the amplifier 2, represented at curve (E) of FIG. 3, has a characteristic that varies in generally inverse relation to the characteristic $V_B$ during the scanning portion of each track cycle.

The voltage $V_E$ is applied to the input of a differentiating stage 5. The stage 5 reacts to the initial negativegoing transition at time $T_1$ to produce a positive-going pulse transition. Such transition is applied, through a limiting amplifier 6, to the input of a Schmitt trigger 7, which generates a short-duration pulse 106 whose trailing edge occurs at a time $T_2$. Such pulse is indicated at curve (F) in FIG. 3.

As the tracking voltage $V_A$ continues to rise, the detected voltage $V_B$ will initially decrease toward a minimum at point B, occurring at the depicted instant $T_3$. Such minimum point will correspond to a maximum point B on the characteristic $V_E$, and the resultant passage of the characteristic $V_E$ past its maximum inflection point B will cause the differentiator 5 to again generate a positive step in voltage, thereby again triggering a pulse from the Schmitt trigger 7.

As the staircase characteristic $V_A$ progresses further, the detected voltage $V_B$ rises from its minimum point B to a maximum at the time $T_4$. Such point corresponds to the passage of the logarithmic amplifier curve $V_E$ through its minimum, so that the differentiator 5 will again exhibit a negative-going transition to terminate the pulse at the output of the Schmitt trigger 7. Because of the finite response time of the processing portion 101, the termination of the Schmitt trigger pulse at time $T_5$ will lag slightly with respect to the occurrence of the video amplitude maximum at the time $T_4$.

The occurrence of the trailing edge of the Schmitt trigger output 106 is applied to the triggering input of a first bistable multivibrator 8, forming a portion of an asynchronous binary converter 111. The multivibrator 8 responds to the application of the negative-going trailing edge to initiate, at its output, a positive leading edge of a pulse $V_G$ illustrated in curve (G) in FIG. 3. Such characteristic $V_G$ is applied to a triggering input of a second bistable multivibrator 9 in the converter 111. The negative-going trailing edge of the Schmitt trigger pulse $V_F$, corresponding to the occurrence of the video amplitude maximum, terminates the output pulse $V_G$ from the bistable multivibrator 8, and thereby applies a negativegoing pulse transition to the trigger input of the multivibrator 9. This, in turn, causes the initiation of a stop pulse $V_H$ from the multivibrator 9. Such stop pulse is employed to stop the progressive incrementing of the staircase voltage $V_A$ and to reset certain other voltages in the depicted arrangement 51.

The stop pulse at the output of the multivibrator 9 is coupled to the inhibiting input 81 of the clock pulse generator 10, and the resultant cut-off of clock pulses stops the further incrementing of the binary counter 11. As a result, the voltage level, represented at 121, attained by the staircase characteristic $V_A$ at the scan-termination instant $T_5$ is stored in the counter 11, and serves as a constant-amplitude control for the tape drive servo, which in turn maintains the tape position, relative to the scanning path of the heads 54, 56, at the approximate position represented by the maximum point reached by the characteristic $V_B$ at the instant $T_4$. The optimum value of the voltage $V_A$, corresponding to the video maximum, is the somewhat smaller level 122 corresponding to the time $T_4$.

In accordance with the invention, the attained voltage level of the staircase characteristic $V_A$ at the termination of scan is reduced to the optimum level 122 with the use of a correcting element 15. The element 15, which may illustratively be embodied as a transistor operating in a constantcurrent characteristic, is normally ineffective to alter the staircase wave form $V_A$ applied to the input of the tape velocity regulator 63. However, upon the application of the stop pulse $V_H$ from the output of the multivibrator 9 to an enabling input 122 of the element 15, such element acts to reduce the level $V_A$, applied to its input via a DC amplifier 13 and a low pass filter 14, by an amount corresponding to the increase in the level of the voltage $V_A$ between the instants $T_4$ and $T_5$, i.e., by the difference between the levels 121 and 122. Because such reduction in voltage effects only the stored constant level of the characteristic $V_A$, the linear characteristics of the progressively rising portion thereof during the normal scan operation is not affected.

The differentiating stage 6 and the Schmitt trigger 7 are reset, following the termination of scan, by the stop pulse which is coupled to the processing path 101 via a diode $D_2$.

The initial enabling of the processing path 101 at the start of the playback mode of the recorder 51 may be accomplished by applying a playback start pulse to the input of a trigger generator 16, which excites a trigger input 132 of the multivibrator 17. Such excitation causes the generation of a pulse of duration $T_1$ on the multivibrator output 102, which is coupled via diode $D_3$ to the input of the logarithmic amplifier 2 as discussed above.

In FIG. 2, an auxiliary reset path 141 is associated with the components described above in connection with FIG. 1. The path 141 may be useful, e.g., when a plurality of magnetic pick-up heads are associated with a plurality of video tracks on the tape 52, whereupon portions of successive ones of the video tracks are scanned in rotation. In order to mask the resulting switching transcients, a null detector 19 at the input of the path 141 is coupled in succession to the successive pick-up heads, such switching arrangement being collectively depicted as a box 142.

The pulses at the output of the detector 19, representing the switching transcients in the box 142, are coupled to a pulse integrator 20. When the output of the integrator 20 has risen to a level that exceeds a triggering level of a following threshold element 21, the element 21 excites the input of a pulse generator 23 after a delay (illustratively six seconds) determined by a delay element 22. The pulse output of the generator 23 is coupled to the reset input of the multivibrator 17, which thereupon initiates the generation, on its output line 97, of the inhibiting $V_D$ to prevent variation of the tracking voltage (and thereby further movement of the video track relative to the scanning paths of the pick-up heads) for the interval $T_1$. The path 141 may be further rendered ineffective after the start of the scanning portion of the tracking voltage $V_A$ by coupling the output of the multivibrator 9 to the path 141 via a diode $D_4$.

In the foregoing, an illustrative arrangement of the invention has been described. Many variations and modifications will now occur to those skilled in the art. It is accordingly desired that the scope of the appended claims not be limited to the specific disclosure herein contained.

What is claimed is:

1. In a helical scan video recorder adapted for reproducing video signals modulated on a highfrequency carrier and fixed on at least one track of an elongated magnetic tape, the tape being wrappable helically about a rotatably mounted drum, detecting means including a magnetic pick-up head rotatable in a scanning path on the periphery of the drum for detecting video signals modulated on an associated track of the tape as the tape is advanced along a helical path about the periphery of said drum, means for longitudinally advancing the tape, means responsive to the detecting means for generating a tracking control signal, and tape velocity regulation means coupled to the output of the tracking control signal generating means and cooperable with the tape advancing means for varying the velocity of advance of the tape in accordance with variations of the tracking control signal to correspondingly vary the amplitude of the detected video signal, the improvement wherein the tracking control signal generating means comprises, in combination, clock pulse generating means cyclically operable with a first repetition interval and having a first control input, the clock pulse generating means being disabled upon the application of a pulse to the first control input, resettable stepping means coupled to the output of the clock pulse generating means for normally generating, as the tracking control voltage, a repetitive DC staircase voltage over a second repetition interval long with respect to the first interval while the clock pulse generating means remains enabled, the staircase voltage normally progressing from a first relatively low level to a second relatively high level in increments determined by the first repetition interval and the dropping abruptly from the second level to the first level at the end of the second repetition interval, the stepping means being adapted to store the staircase voltage level attained at the instant that the clock pulse generating means is disabled, pulse forming means coupled to the output of the detecting means and responsive to the successive passage of the detected video pulse amplitude through a minimum and a following maximum during the second interval for generating a stop pulse, and means for coupling the output of the stop pulse generating means to the first control input of the clock pulse generating means.

2. A recorder as defined in claim 1, in which the stop pulse generating means comprises, in combination, first differentiating means coupled to the output of the detecting means and operative for generating a first pulse transition of a prescribed first sense when the detected video signal amplitude goes through a maximum and for generating a second pulse transition of the opposite sense when such amplitude goes through a minimum, and digital converting means responsive to the successive occurrence of two first pulse transitions during the second interval for producing the stop pulse at an instant ideally coincident with the occurrence of the second one of the first pulse transitions.

3. A recorder as defined in claim 2, in which the digital converting means comprises, in combination, first and second bistable multivibrators each having a triggering input responsive to the application of a pair of successive pulse transitions of identical senses to individually initiate and terminate, respectively, a pair of first pulses at the outputs of the first and second bistable multivibrators, the trailing edges of each of the first pulses exhibiting a transition whose sense corresponds to the sense of the first pulse transition from the pulse forming means, means for coupling the output of the first bistable multivibrator to the triggering input of the second bistable multivibrator so that the trailing edge of the first pulse from the first bistable multivibrator is effective to initiate a first pulse at the output of the second bistable multivibrator, means for coupling the output of the pulse forming means to the triggering input of the first bistable multivibrator, and means for coupling the output of the second bistable multivibrator to the first control input of the clock pulse generating means.

4. A recorder as defined in claim 1, in which the tracking control signal generating means further comprises, in combination, normally unoperated correction means coupled to the output of the stepping means and having a second control input, the correction means including means for decreasing the thenoccurring voltage level of the staircase voltage at the output of the stepping means by a predetermined amount when the correcting means are operated, the correcting means being operated by the application of a pulse to the second control input thereof, and means for coupling the output of the stop signal generating means to the second control input of the correcting means to operate the correcting means with the stop pulse and thereby to subtract the predetermined value from the attained stored value of the staircase voltage level.

5. A recorder as defined in claim 1, in which the stepping means has a disabling input for inhibiting the progression of the staircase voltage when a pulse is applied to such disabling input, and in which the tracking control voltage generating means further comprises, in combination, a monostable multivibrator having a reset trigger input and adapted to produce an inhibiting pulse of a prescribed duration at its output when a pulse is applied to the reset input thereof, means coupled to the output of the stepping means for generating a trigger pulse in response to each normal decrease in staircase voltage from the second to the first level at the end of each second repetition interval, means for coupling the output of the trigger pulse generating means to the reset input of the monostable multivibrator, and means for coupling the output of the monostable multivibrator to the disabling input of the stepping means.

6. A recorder as defined in claim 5, in which the stop pulse generating means has a reset input for terminating the stop pulse upon the application of a pulse to the reset input thereof, and in which the tracking control voltage generating means comprises means for coupling the output of the monostable multivibrator to the reset input of the stop pulse generating means.

7. A recorder as defined in claim 5, in which the pulse forming means has an inhibiting input for preventing generation of the first and second pulse transitions when a pulse is applied to the inhibiting input thereof, and in which the tracking control voltage generating means further comprises means for coupling the output of the monostable multivibrator to the inhibiting input of the pulse forming means.

8. A recorder as defined in claim 5, in which a plurality of rotatable pick-up heads are associated with a corresponding plurality of video tracks on the tape, in which the recorder further comprises null detecting means sequentially connectable to the successive pick-up heads to produce a sequence of pulses indicative of transitions between successive ones of the tracks, pulse integrating means coupled to the output of the null detecting means, threshold means coupled to the output of the integrating means for yielding an indication when the output of the integrating means exceeds a predetermined value, and means for coupling the indication at the output of the threshold means to the reset input of the monostable multivibrator.

9. A recorder as defined in claim 8, in which the indication coupling means comprises means for delaying the indication by a predetermined interval.

* * * * *